United States Patent
Bisson et al.

(10) Patent No.: US 10,111,450 B2
(45) Date of Patent: Oct. 30, 2018

(54) PROCESS FOR MAKING A MULTIPHASE JELLIFIED BEVERAGE COMPOSITION

(75) Inventors: Jean-Pierre Bisson, Caen (FR); Jean-Marc Delort, La Tour de Peilz (CH); Anne Marcout, Lisieux (FR)

(73) Assignee: Nestec S.A., Vevey (CH)

( * ) Notice: Subject to any disclaimer, the term of this patent is extended or adjusted under 35 U.S.C. 154(b) by 705 days.

(21) Appl. No.: 13/505,171

(22) PCT Filed: Oct. 25, 2010

(86) PCT No.: PCT/EP2010/066090
§ 371 (c)(1),
(2), (4) Date: Jun. 13, 2012

(87) PCT Pub. No.: WO2011/051238
PCT Pub. Date: May 5, 2011

(65) Prior Publication Data
US 2012/0276270 A1   Nov. 1, 2012

(30) Foreign Application Priority Data

Oct. 28, 2009 (EP) .................... 09174317

(51) Int. Cl.
*A23L 2/02* (2006.01)
*A23L 29/256* (2016.01)
*A23L 29/238* (2016.01)
*A23C 9/154* (2006.01)
*A23L 2/38* (2006.01)
*A23L 2/52* (2006.01)

(52) U.S. Cl.
CPC .............. *A23L 2/02* (2013.01); *A23C 9/1544* (2013.01); *A23L 2/38* (2013.01); *A23L 2/52* (2013.01); *A23L 29/238* (2016.08); *A23L 29/256* (2016.08); *A23V 2002/00* (2013.01)

(58) Field of Classification Search
CPC .............. A23L 1/532; A23L 1/541; A23L 2/52
See application file for complete search history.

(56) References Cited

U.S. PATENT DOCUMENTS 3,969,536 A * 7/1976 Ikeda et al. .................. 426/573
2008/0133165 A1   6/2008 Iwamoto et al.

FOREIGN PATENT DOCUMENTS

| CN | 1260686 | 7/2000 |
|---|---|---|
| CN | 1820657 | 8/2006 |
| EP | 1415548 | 5/2004 |
| JP | 6269956 | 3/1987 |
| JP | S62248464 | 10/1987 |
| JP | 09-009891 | 1/1997 |
| JP | 2004-215526 | 8/2004 |
| JP | 2004-313113 | 11/2004 |
| JP | 2004313123 | 11/2004 |
| JP | 2005168459 | 6/2005 |
| JP | 2007-189922 | 8/2007 |
| JP | 2007284381 | 11/2007 |
| JP | 2009183226 | 8/2009 |
| JP | 2010127244 | 6/2010 |
| WO | WO0195742 | 12/2001 |
| WO | 2004/075669 A1 | 9/2004 |

OTHER PUBLICATIONS

International Search Report dated Nov. 30, 2010 for corresponding Intl. Appln. No. PCT/EP2010/066090.
Written Opinion dated Apr. 28, 2012 for corresponding Intl. Appln. No. PCT/EP2010/066090.
H. Iwamori et al., "Physical properties of the mixed gels of K-carrageenan with locust bean gum and gels prepared from commercially available gelling agents," The Niigata Journal of Health and Welfare, vol. 2, No. 1, 2003, pp. 62-68.

* cited by examiner

*Primary Examiner* — D. Lawrence Tarazano
*Assistant Examiner* — Stephanie A Cox
(74) *Attorney, Agent, or Firm* — K&L Gates LLP

(57) ABSTRACT

The present invention is directed to a process for producing a water, juice, and/or milk-based ready-to-drink jellified product comprising at least two separate homogeneous gel masses, wherein adjacent separate gel masses have different gel strengths, characterized in that it comprises the steps of in order: (i) separately preparing at least two liquefied gel compositions, each comprising an aqueous, and/or juicy, and/or dairy base, mixed with carrageenan and galactomannan, (ii) separately preheating each of the compositions, (iii) separately mixing each of the liquefied gel compositions, (iv) separately cooling down each of the liquefied gel compositions, while keeping a constant agitation of the mass of each of the liquefied gel compositions, (vi) sequentially dosing each of the liquefied gel compositions into a container.

6 Claims, No Drawings

PROCESS FOR MAKING A MULTIPHASE JELLIFIED BEVERAGE COMPOSITION

CROSS REFERENCE TO RELATED APPLICATIONS

The present application is a National Stage of International Application No. PCT/EP2010/066090, filed on Oct. 25, 2010, which claims priority to European Patent Application No. 09174317.9, filed on Oct. 28, 2009, the entire contents of which are being incorporated herein by reference.

FIELD OF THE INVENTION

The present invention concerns a new range of industrial ready-to-drink, preferably chilled, beverages, which exhibit a new attractive aspect, new mouthfeel, and offer an original usage to consumers.

BACKGROUND OF THE INVENTION

Current industrial ready-to-drink (RTD) beverages offer, consists in monophasic liquids, stored at chilled or ambient temperature. These are typically RTD coffee products like Nesfrappé®, RTD juices like Nestlé-Boost®.

The preparation of jellified RTD products is know from prior art. These products consist monophasic products. Very often the gel strength is difficult to control; the patent JP 2004215526 A describes the addition of a solid, non edible, ball into the bottle cap in order to help breaking the gel before drinking.

However, such a solution to provide jellified RTD beverages with consistent and acceptable texture and viscosity, that is also compatible with the drinking action of the consumer, has a big disadvantage: inserting a solid ball into the bottle can be very dangerous, as the ball can be swallowed by the consumer together with the drink, which may result of severe injuries.

It is therefore one main objective of the present invention, to provide the consumers with an attractive jellified ready-to-drink beverage wherein the gel strength and viscosity are compatible with the drinking action, and is suitable for any kind of consumer wish, i.e. a RTD beverage that is not too solid, or not too liquid for the consumer, and which also completely safe for the consumer.

SUMMARY OF THE INVENTION

The objective mentioned above is met with a process for producing a water, juice, and/or milk-based ready-to-drink jellified product comprising at least two separate homogeneous gel masses, wherein adjacent separate gel masses have different gel strengths, characterized in that it comprises the steps of, in order:

(i) separately preparing at least two liquefied gel compositions, each comprising an aqueous, and/or juicy, and/or dairy base, mixed with carrageenan and galactomannan, (ii) separately preheating each of the compositions to at least 60° C., preferably at least 70° C. for at least 10, preferably 20 seconds, (iii) separately mixing each of the liquefied gel compositions at a temperature of at least 65° C., preferably at least 70° C., more preferably a temperature comprised between 70 and 75° C., for a period of time comprised between 30 seconds and 5 minutes, preferably for about 2 minutes, (iv) separately cooling down each of the liquefied gel compositions at a temperature comprised between 40° C. and 50° C., preferably at a temperature of 45° C., (v) separately cooling down each of the liquefied gel compositions at a temperature comprised between 30° C. and 38° C., preferably between 33° C. and 35° C., more preferably at a temperature of 34° C., while keeping a constant agitation of the mass of each of the liquefied gel compositions, (vi) sequentially dosing each of the liquefied gel compositions into a container.

Preferably, in the process according to the invention:

(i) the concentration of carrageenan is equal or lower than 0.30% by weight of product, preferably equal or lower than 0.15% by weight of product when the product base contains milk, and (ii) the concentration of galactomannan is comprised between 0.01% and 0.1% by weight of product.

Moreover, the process according to the invention is preferably such that the gel strength of the gel masses at room temperature, when the product is fully jellified, is comprised between 10 and 400 g, preferably between 20 and 300 g, more preferably between 30 and 320 g.

Even more preferably, the process of the invention is such that the gel strengths of adjacent gel masses in the product, at room temperature, when said product is fully jellified, differ by at least 10%, preferably by at least 25%, more preferably by at least 50%.

The present invention is further directed to a process for the preparation of a jellified ready-to-drink beverage composition comprising gel particles having various gel strengths comprised between 10 and 400 g, preferably between 20 and 300 g, more preferably between 30 and 320 g, which comprises the steps of, in order:

(i) providing a water, juice, and/or milk-based ready-to-drink jellified product comprising at least two separate homogeneous gel masses, wherein adjacent separate gel masses have different gel strengths, (ii) shaking manually this product for a period of time sufficient to break the weakest gel mass into particles.

Preferably, this process is such that at least one of the gel masses has a viscosity at 8° C. that is lower than 1000 mPa·s, measured with a Brookfield viscosimeter.

This product range is characterised as multiphase drinkable products, whose phases (i.e. gel masses) only mix when the consumer shakes the product before consumption. Actually, shaking the product is not an absolute requirement, and the consumer has the choice to consume the product in the state she/he chooses, that is to:

not shaked at all: the gel masses stay independent and unbroken, or partially shaken: at least some of the gel masses are broken into pieces and at least partially mixed, or thoroughly shaken: all gel masses in the product are broken into particles and mixed; in some cases if the gel strength and viscosity of all gel masses in the product are low, the final appearance of the product is substantially homogeneous.

The key novelty of the invention is that the consumer customises the resulting product aspect, according to the shaking strength and duration he applies to the product.

DETAILED DESCRIPTION OF THE INVENTION

As stated previously, the present invention concerns a water, juice, and/or milk-based jellified ready-to-drink product that comprises at least two separate homogeneous gel masses, wherein adjacent separate gel masses have different gel strengths.

Advantageously, the gel strengths of two adjacent separate gel masses differ by at least 10%, preferably by at least 25%, more preferably by at least 50%. Such a difference allows one of the two masses to be broken into smaller particles by the stronger gel mass, if a shaking movement is applied to the product by a consumer.

In a highly preferred embodiment of the present invention, each of the separate gel masses comprises a mix of carrageenan and galactomannan.

The phases composing the product can be either neutral or acidic. They can be water-based, juice-based or milk-based.

In the trials that were performed with a chilled product, the shelf life that was achieved was up to 45 days, at 4 to 8° C. storage temperature. The products according to the present invention could also be made shelf-stable at higher temperatures, typically at room temperature for at least 4 weeks.

By shaking more or less the product (which is typically packed into a bottle), the consumer can adapt the appearance of the product before drinking. With no shaking, the consumer can drink the different gel phases one after the other. With little shaking, the gel masses are little broken into big particles, and little mixed one to another. In case the consumer chooses to shake the product vigorously and for a long time (10 seconds or more for instance), the different gel masses are broken into fine particles and mixed one into the other, depending on the thixotropy of the different gel masses in the product.

This innovative product behaviour has been made possible by the association of:
- manufacturing capability: a control of viscosity and gelling kinetics of the gels according to temperature, the dosing capabilities of each individual phase; all these parameters helps ensuring the production of the multiphase product visuals, such that the different phases do not mix unless hand shaking during and after filling the product;
- the control of the gel strength of each phase by the formulation (in particular specific gel strength ratio between the different phases composing the product, and the easy gel breaking capability of at least one phase).
- the adaptation of the packaging dimensions of format: in particular, if the package containing the product has a big headspace compared to the product volume contents, it will be easier to mix the different gel masses together by shaking. For instance a headspace in the package, representing at least 10% of the total internal volume of the package will ease the mixing process of the different gel masses during shaking.

EXAMPLES

The following table presents various recipes of gel masses that were manufactured according to the present invention.

It is to be noted that out of the twelve recipes (J1 to J12) presented herebelow, two of them (J5 and J7) were considered as not acceptable because the gel strength that was measured for at least one of the gel masses was too high, so it would not break easily under manual agitation by a consumer.

| Reference Flavour | J1 | J2 | J3 | J4 | J5 | J6 | J7 | J8 |
|---|---|---|---|---|---|---|---|---|
| | | coffee | | | | | milk | |
| Ingredients % | | | | | | | | |
| Water | 87.85 | 88 | 97.85 | 98 | | | | |
| Fruit juice | | | | | | | | |
| Skimmed milk | | | | | 89.65 | 89.8 | 99.65 | 99.8 |
| Sugar | 10 | 10 | | | 10 | 10 | | |
| Coffee "Nescafé" | 1.8 | 1.8 | 1.8 | 1.8 | | | | |
| Carrageenan Gelogen BW56 | 0.3 | 0.15 | 0.3 | 0.15 | 0.3 | 0.15 | 0.3 | 0.15 |
| Guar gum Meyprodor 400 | 0.05 | 0.05 | 0.05 | 0.05 | 0.05 | 0.05 | 0.05 | 0.05 |
| Total solids (%) | 11.8 | 11.7 | 2.1 | 1.9 | 18.1 | 18 | 9.4 | 9.3 |

| Reference Flavour | J9 | J10 | J11 | J12 |
|---|---|---|---|---|
| | apple | | orange | |
| Ingredients % | | | | |
| Water | | | | |
| Fruit juice | 99.65 | 99.8 | 99.65 | 99.8 |
| Skimmed milk | | | | |
| Sugar | | | | |
| Coffee "Nescafé" | | | | |
| Carrageenan Gelogen BW56 | 0.3 | 0.15 | 0.3 | 0.15 |
| Guar gum Meyprodor 400 | 0.05 | 0.05 | 0.05 | 0.05 |
| Total solids (%) | 12.1 | 11.9 | 12.6 | 12.4 |

All concentrations are given in percentage by weight of the total gel mass. It is also to be noted that the various gel masses J1 to J4, J6 and J8 and J12 given as examples above, can be mixed to make a finished product according to the invention, and comprising at least two gel masses.

The various gel masses given in example hereinabove have the following characteristics when analyzed.

| Reference Flavour | J1 | J2 | J3 | J4 | J5 | J6 | J7 | J8 |
|---|---|---|---|---|---|---|---|---|
| | | coffee | | | | | milk | |
| Analysis | | | | | | | | |
| pH | 5.54 | 5.49 | 5.58 | 5.40 | 6.49 | 6.50 | 6.56 | 6.56 |
| density | 1.048 | 1.048 | 1.007 | 1.007 | na | 1.076 | na | na |
| Brookfield viscosity mPas · s | 10900 | 1200 | 7600 | 880 | 127000 | 41600 | 91600 | 31000 |

-continued

| | | | | | | | | |
|---|---|---|---|---|---|---|---|---|
| Gel strength (g) | 63 | 39 | 45 | 37 | 450 | 210 | 315 | 151 |
| Yield stress (Pa) | 12 | <1 | na | <1 | na | na | na | na |
| Viscosity at a shear rate of 1000 s−1 (mPa · s) | 52 | 16 | na | 14 | na | na | na | na |

| Reference | J9 | J10 | J11 | J12 |
|---|---|---|---|---|
| Flavour | | apple | | orange |
| | | Analysis | | |
| pH | 3.63 | 3.58 | 3.94 | 3.87 |
| density | 1.048 | 1.046 | 1.048 | 1.046 |
| Brookfield viscosity mPas · s | 9600 | 720 | 19200 | 2240 |
| Gel strength (g) | 57 | 39 | 132 | 24 |
| Yield stress (Pa) | 14 | <1 | 37 | <1 |
| Viscosity at a shear rate of 1000 s−1 (mPa · s) | 45 | <10 | 63 | 14 |

The viscosities mentioned in the recipe examples given above are measured by using a standard Brookfield viscosimeter at a temperature of 8° C., with selected disc diameter/mobile sizes, and rotation speeds, depending on the formulations, as follows:

J2, J4, J10 and J12: Mobile 04, speed 50 rpm;
J1, J3, J9 and J11: Mobile 92, speed 5 rpm;
J5, J6, J7 and J8: Mobile 93, speed 5 rpm.

We learn from these results that in the case of coffee-based or fruit juice-based gels, the stabilisers are mostly responsible for the texture, with little impact of the pH or solids content. A low level of carrageenan gives "liquid gels" without yield stress (recipes J2, J4, J10 and J12), while a higher concentration of carrageenan gives soft gels (recipes J1, J3, J9 and J11).

With a milk base, the rheological measurements are less relevant because of the jellified structure and slippery surface, and are therefore marked as "not applicable" (na).

But what can be concluded from the tests is that the synergistic effect between milk and carrageenan gives strong gels in any case, and one can consider that the recipes with 0.15% carrageenan (J6 and J8) are the upper limit for the viscosity range of our product. Thus recipes J5 and J7 are not acceptable as it would be too difficult for a consumer to break the corresponding gel mass and have it mixed with the other gel mass(es) in the product, even with thorough shaking (especially in case of a child or an elderly person having less strength).

Basically, all the gel masses recipes that are considered as acceptable in the field of the present invention, are those which allow a consumer to break the different gel masses into particles of less than 5 mm of average section, and mix the said gel masses, by hand shaking the packaged product for a period of time of less than 30 seconds, preferably less than 15 seconds, and preferably for a period of time comprised between 5 and 10 seconds, for a volume of product which is 500 ml.

The objective of the present invention is to provide a consumer with a product that can be shaken by any type of person being at least 5 years old, in good health without making any abnormal effort.

Process

The process for manufacturing a product according to the present invention comprises the steps of, in order:

(i) separately preparing at least two liquefied gel compositions, each comprising an aqueous, and/or juicy, and/or dairy base, mixed with carrageenan and galactomannan, (ii) separately preheating each of the compositions to at least 60° C., preferably at least 70° C. for at least 10, preferably 20 seconds, (iii) separately mixing each of the liquefied gel compositions at a temperature of at least 65° C., preferably at least 70° C., more preferably a temperature comprised between 70 and 75° C., for a period of time comprised between 30 seconds and 5 minutes, preferably for about 2 minutes, (iv) separately cooling down each of the liquefied gel compositions at a temperature comprised between 40° C. and 50° C., preferably at a temperature of 45° C., (v) separately cooling down each of the liquefied gel compositions at a temperature comprised between 30° C. and 38° C., preferably between 33° C. and 35° C., more preferably at a temperature of 34° C., while keeping a constant agitation of the mass of each of the liquefied gel compositions, (vi) sequentially dosing each of the liquefied gel compositions into a container at a temperature lower than 40° C., preferably a temperature below 30° C.

During the manufacturing process of the product, in order to further control the gelling kinetics and the firmness of gels, further tests were performed, focusing on the use of lower quantity of carrageenan, sometimes mixed with galactomannan (e.g. guar) in order to balance the gel firmness (gel strength) versus viscosity.

So as can be understood, the level of carrageenan will mainly influence the viscosity (flowability) of the gel masses, while the level of galactomannan will mainly influence the gel strength (ability to break under mechanical constraints).

Unexpectedly, it was observed that for specific concentrations and ratios of carrageenan to guar, it was possible to dose different product phases sequentially, that do not mix during and after filling, and get a spoonable aspect.

Dosing at a temperature below jelling point but in a dynamic state which prevents jellification of the product during the dosing is essential to be able to dose alternatively two gels in the liquid state, which would otherwise not be flowable at this level of temperature. Due to the constant agitation in the gel masses (dynamic state), the flowability is guaranteed for dosing, until each of the gel masses is dosed in the destination packaging. After the dosing step, the agitation is stopped, so that the gel mass is extremely rapidly jellified (i.e. within a few seconds). As a result, two gel masses which are sequentially dosed in the same packaging but with only a few seconds one after the other, do not migrate one into the other.

In other words, the principle is that the phases are dosed alternatively in an instable liquid state at 35-45° C. into transparent bottles; this instable liquid state of the gel masses can be maintained by continuous agitation of the said masses, which brings energy to these masses, thus preventing the jellification to take place; as soon as the agitation stops, each of the gel masses starts to jellify very rapidly (within a few seconds), so that the gel masses dosed one after the other in a package do not migrate one into the other, although the sequence of dosing of the different gel masses can be quick (a few seconds of interruption between the dosage of two different gel masses), that is to say, compatible with industrial needs of high speed production.

About 30 seconds (or less depending on the gel mass recipe and gelling agent concentration) after dosing, and before starting to migrate into adjacent gel masses, each phase (gel mass) is setting into a solid state.

Optionally, an additional layer (topping, puree, mousses, other gel with a different colouring or aroma . . . ) can be added on top of this gelled mix to make a bi-layer drink;

Then the product is sealed and cooled to 4° C. This cooling step helps achieving the final gel setting of each phase and "solidify" the product;

In such a state, the product can be transported, with limited risk of loosing the unmixed phases or layers;

The phases will fluidize/break/mix only when the consumer handles the bottle and shakes it during at least 5 to 10 seconds.

The present invention provides the following advantages:

it provides a consumer with multiphase drinkable gels (by multiphase, it is meant that the product comprises different gel masses), with eventually another phase like foam topping, exhibiting an appealing and stable visual appearance until the product is consumed;

the product visual appearance can be entirely chosen by the consumer, by choosing to shake the product or not; the sensation in mouth (or "mouthfeel") can also be freely chosen by the consumer by shaking the product, more or less, or not at all; typically the texture (gel masses, big particles, small particles, etc), the viscosity (due to the thyxotropic effect in the gel masses, the viscosity can be decreased by shaking) can be freely adapted by the consumer before, or even during consumption (the consumer can choose to re-close the package and shake the product between two gulps);

the manufacturer is able to dose at least two drinkable gel phases in a bottle, without mixing them, while using existing production lines, then let them jellify, so that they remain unmixed during transportation until consumer has the opportunity to consume the product;

the product recipes can vary, and involve various ingredient, and for instance, all of the gel masses in the product can be made out of pure natural and tasty ingredients.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A process comprising the steps of, in order:
providing a water, juice, and/or milk-based jellified product comprising at least two separate homogeneous gel masses, each of the separate homogeneous gel masses comprising carrageenan and galactomannan, wherein adjacent separate gel masses have different gel strengths between 10 and 400 g; and
manually shaking the product for a period of time sufficient to break the weakest gel mass into particles to form a jellified ready-to-drink beverage.

2. The process according to claim 1, wherein at least one of the gel masses has a viscosity at 8° C. that is lower than 1000 mPa·s, measured with a Brookfield viscosimeter.

3. The process according to claim 1, wherein the gel strengths of adjacent gel masses in the product, at room temperature, when the product is fully jellified, differ by at least 50%.

4. The process according to claim 1, wherein the gel strengths of adjacent gel masses in the product, at room temperature, when the product is fully jellified, differ by at least 25%.

5. The process according to claim 1, wherein the gel strengths of adjacent gel masses in the product, at room temperature, when the product is fully jellified, differ by at least 10%.

6. The process according to claim 1, wherein the carrageenan and the galactomannan are the only gelling agents in the ready-to-drink beverage.

* * * * *